March 15, 1949.    A. C. FLETCHER ET AL    2,464,679
ELECTRIC WELDING APPARATUS
Filed Oct. 16, 1945
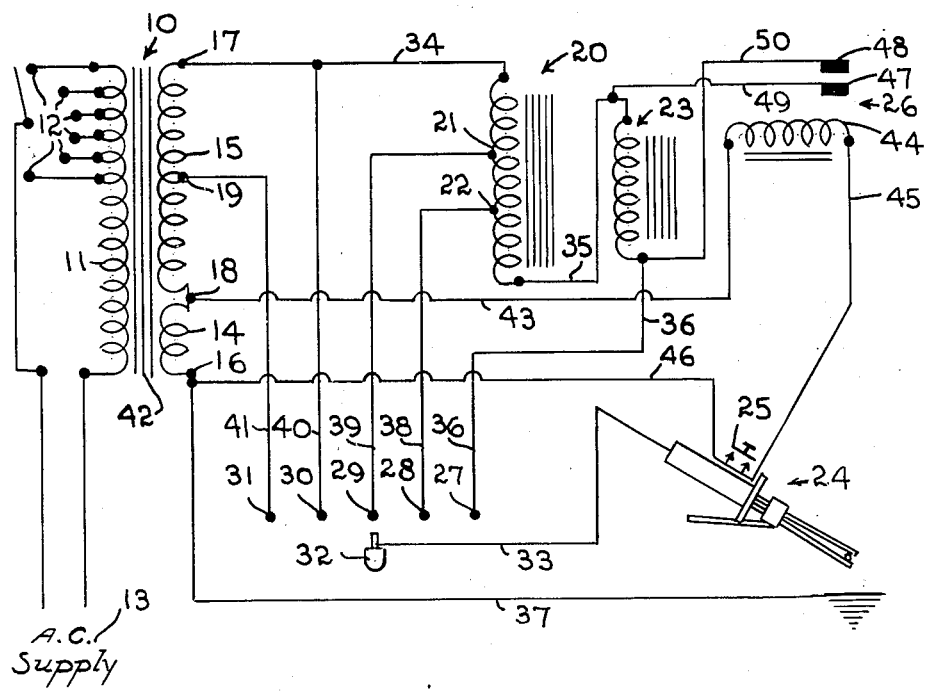
INVENTORS.
Albert C. Fletcher
Donald Lloyd
BY
ATTORNEYS.

Patented Mar. 15, 1949

2,464,679

UNITED STATES PATENT OFFICE 2,464,679

ELECTRIC WELDING APPARATUS

Albert C. Fletcher and Donald Lloyd, Oklahoma City, Okla.

Application October 16, 1945, Serial No. 622,580

4 Claims. (Cl. 219—8)

This invention relates to an alternating current arc welder and more particularly to a control of the welding current whereby it may be raised or lowered as desired by the operator, being under the direct control of the operator's hand holding the electrode holder so that the current may be momentarily increased for striking an arc at the beginning of a welding operation or increased at any instant or for a period of time during a welding operation.

In welders heretofore employed it has been common to use transformers having adjustable primaries to accommodate the transformer to the potential of the supply voltage, tapped secondaries and reactances for adjusting the welding current but the disadvantages in all such welders lay in the operator's inability to raise or lower the heat of the arc while welding. This disadvantage becomes very distinct when welding on thin metals. When an operator is welding a metal of a certain thickness and welds up to a lap or a seam, it becomes impossible to properly weld a structure of this type without stopping the welding operation and changing the heat stage of the welder itself. However, with the type of welder that we have developed, using a push button, or switch, on the handle of the electrode holder, this enables the operator to raise or lower the heat as he may see fit and this is carried out without the necessity of changing the heat stages on the welder itself.

Therefore, the primary object of the present invention is to provide an arc welder with welding current control means under the direct control of the hand of the operator holding the welding electrode during a welding operation. The control is carried on by means of a switch such as a push button on the electrode holder having connections with current control means associated with a transformer for supplying the welding current. A highly satisfactory form of this switch means is disclosed and claimed in the copending application for electrode holders of Donald Lloyd Serial No. 617,034 filed September 18, 1945, which matured in Patent 2,443,467, June 15, 1948, although this push button, or switch, may be mounted in any position that might prove a convenience to the operator.

Another object of this invention is to provide in a welder for a wide current range and divided into a multiplicity of different stages, for example from 5 to 250 amperes and divided into as many as up to 36 stages.

The welders on the market today do not have low heat ranges and due to this the operator is unable to strike and maintain an arc at a low current range. The low heat range on the welders heretofore manufactured has been in the range of 15 to 20 amperes; this current is too high for the welding of thin metals. When using a current of 15 to 20 amperes on thin metals, the result is the burning of holes and improper fusion. It also has been impossible to correctly weld through various thickness, laps or seams of metal without changing the heat range on the welder itself.

The above mentioned disadvantages are overcome in our welder by so designing the circuit and push button control in order that the welder may strike an arc and weld as low as five amperes. Also, the control enables the operator to raise or lower the heat of the arc at will; this enables the welder to weld through various thicknesses of metal, laps and seams.

Accordingly, another object of this invention is to overcome such difficulties by providing a welder which will deliver a low current such as 5 amperes for conducting a welding operation and to provide in conjunction therewith control means in the hands of the operator for momentarily increasing the current for starting the arc or operating over laps, seams or the like. The welding at the extreme low current is accomplished by striking the arc at a higher current, and once the arc is established, the operator may immediately drop the current and weld at the extreme low heat. The striking of the arc at higher current will not burn a hole in the metal due to the momentary dissipation of heat. This momentary dissipation of heat enables the operator to strike an arc, then by the push button or the switch, may immediately drop the heat to the desired welding current, and in turn, perfect welds may be obtained on thin metals.

Further features, objects, details and advantages of the alternating current arc welder in accordance with our invention will appear in the following description, in conjunction with the accompanying drawings diagrammatically illustrating a preferred form of the welder circuits and forming a part of this specification.

Referring to the drawing, the welder illustrated in general includes a transformer 10 having a primary winding 11 with six potential taps 12 for connection with an alternating source of electric power 13. The secondary of this transformer is illustrated as comprising two windings 14 and 15 connected in series and having connections at the ends 16 and 17 and intermediate tap connections 18 and 19.

In addition to the tapped secondary of transformer 10 the welding current circuit also has a reactance 20 having taps 21 and 22 and a second reactance 23. These reactances and the transformer secondary windings are all connected in series for giving a very low welding current, say 5 amperes, as will be referred to presently.

The welder also includes an electrode holder 24 which may be of the type generally disclosed in the Reissue Patent 20,808 to Jack Churchward although any other form of electrode holder as desired may be employed. Electrode holder 24 is provided with a switch such as a push button switch 25 in the handle as shown, or on the guard as illustrated in the copending application of Donald Lloyd, hereinbefore referred to, or in any other desired position convenient for operation during a welding operation by the hand of the operator holding the electrode.

In the control of the welding current the welder is provided with a relay 26 which is actuated by the closing of switch 25 on electrode holder 24 for the purpose of short circuiting the second reactance 23 for increasing the welding current, which together with the operating circuits for the purpose will be further set forth hereinafter.

In addition to the above apparatus, the welder as illustrated includes five plug connectors 27 to 31 inclusive in the welding current circuit in which connectors a plug 32 may be inserted. Plug 32 is connected with a cable 33 for conducting welding current to the electrode carried by electrode holder 24.

The transformer secondary or welding current circuit as a whole comprises the secondary windings 14 and 15 which are connected in series (with the tap 18, therebetween), starting with winding 15 the circuit extends from the end connection 17, through conductor 34, reactance 20, conductor 35, second reactance 23, conductor 36, plug connector 27, plug 32, cable 33 to the electrode of electrode holder 24, thence to "ground," that is the metal member or members to be welded, and the circuit is completed by the conductor cable 37 therefrom to end connection 16 of secondary winding 14. Plug connector 28 is connected by means of conductor 38 with tap 22 of reactance 20, and conductor 39 similarly connects plug connector 29 with tap 21 of the same reactance. Plug connector 30 is connected by conductor 40 with conductor 34 and the end 17 of secondary winding 15 and plug connector 31 is connected by conductor 41 and tap 19 in secondary winding 15.

Thus the five plug connectors provide for five different welding currents, and when the control relay 26 is actuated, a sixth current value is afforded. In addition, while the six potential taps 12 in the transformer primary normally have been used for potential adjustments in accordance with the potential of the power source, the transformer design is such (due to being able to operate the transformer core 42 over a considerable range of permeability) that these transformer taps may also be employed for varying the current in the welding circuit for each of the six current values afforded by the five plug connector and control relay 26. Thus from a minimum current range the current may be increased to a maximum in thirty-six stages whereby the welding current may be controlled with great accuracy.

With respect to the operation of control relay 26 by means of switch 24 the circuit is, from the source of relatively low voltage supply, secondary winding 14 (which also supplies welding current), conductor tap 18, through conductor 43, winding 44 of relay 26, conductor 45, switch 25 and conductor 46 to end 16 of secondary winding 14. When the push button is depressed, switch 25 closes, the circuit is closed and winding 44 of relay 26 is energized to close its contacts 47 and 48. Contacts 47 and 48 are connected by conductors 49 and 50, respectively with the ends of the second reactance 23 so that when these contacts are closed this reactance is short circuited. This short circuiting of reactance 23 increases the minimum current of say 5 amperes in the example for illustration, to a higher value— for example 30 amperes—sufficient for starting the arc, welding heavier materials or portions of the material or the like.

While the switch control of the welding current is illustrated in conjunction with very low welding currents, obviously it may be applied to higher values of current, or in the same manner different ranges in the welding current ranges as will be apparent in view of the foregoing detailed disclosures of a highly satisfactory embodiment of an arrangement particularly adapted for welding thin metals, and the laps or seams therein without changing the heat range of the welder itself. It will be noted in the arrangement disclosed, as stated, the switch control is primarily intended for use only in the lowest welding current range of the welding current power supply system which has a plurality of ranges, this lowest range being lower than the normal low current welding range. The switch control is operable to increase the current of this extremely low range sufficiently (an amount below the next normal welding range) to initiate a welding arc which otherwise would be impossible by the low range current.

Having described our invention, what we claim as new and desire to secure by Letters Patent is:

1. A welder including a transformer said transformer comprising a primary winding having a plurality of potential taps whereby the welding current output of the secondary winding may be obtained in a plurality degrees of adjustment, a secondary winding having a tap whereby the welding current potential may be increased or diminished, a reactance connected with said secondary winding, taps in said reactance also providing different ranges of welding current, a second reactance connected with said first reactance, whereby the welding current output of the transformer may be increased from a minimum to a maximum in six ranges each adjustable in accordance with the number of potential taps in the primary winding of the transformer, a relay for short circuiting said second reactance to increase the welding current an amount intermediate that of the minimum welding current and the amount provided from a tap in said first reactance, and a manually operable switch for energizing said relay at any time desired during a welding operation so as to increase or decrease the welding current without interruption.

2. A welder including a transformer having its primary and secondary windings, means for obtaining different ranges of output current from the secondary winding of the transformer including a reactance for reducing the output current to a low minimum current for welding light weight metals and the like, a switch operable by the hand of the operator performing a welding operation, and means operable when said switch is closed by the operator to short circuit said reactance for increasing the range of the welding current sufficient for starting an arc at the beginning of a welding operation and supplying at will an increased current for welding heavier metal parts and the like during a welding operation without having to manually shift the output current range of the welder.

3. A welder including a transformer, said transformer having a primary having a plurality of potential taps for adjusting each current range of the welding current output, a secondary having a potential tap therein for delivering welding current at different output potential ranges, a tapped reactance connected with said transformer secondary, each tap affording a different welding current range, a second inductance connected in said welding current circuit to afford a minimum low output welding current, a relay having its contacts connected with the terminals of said second inductance for short circuiting the same when the relay is energized, and a push button switch operable when closed to energize the operating coil of said relay for short circuiting the inductance for increasing the welding current under the control of the hand of the operator sufficiently to initiate an arc and during a welding operation as may be required.

4. Electric welding apparatus for alternating current welding including a transformer for supplying welding current in a plurality of ranges to a welding electrode holder in a welding circuit including series reactance means for reducing the current supplied to a low minimum range for welding thin metal members, and manually operable means for momentarily increasing the welding current supplied by said low minimum range sufficiently for striking a welding arc for initiating a welding operation in said range by short circuiting series reactance in the welding circuit and for increasing the current momentarily thereafter as may be required during a welding operation without interrupting the current supply thru the welding circuit.

ALBERT C. FLETCHER.
DONALD LLOYD.

REFERENCES CITED

The following references are of record in the file of this patent:

UNITED STATES PATENTS

| Number | Name | Date |
|---|---|---|
| 1,343,205 | Eschholz et al. | June 15, 1920 |
| 1,628,148 | Hubble | May 10, 1927 |
| 2,043,331 | Notvest | June 9, 1936 |
| 2,197,253 | Hunter | Apr. 16, 1940 |
| 2,239,577 | Serckx | Apr. 22, 1941 |
| 2,276,060 | Owen | Mar. 10, 1942 |
| 2,305,206 | Strabel | Dec. 15, 1942 |